United States Patent
Adachi (10) Patent No.: US 7,706,479 B2
(45) Date of Patent: Apr. 27, 2010

(54) OFDM RECEIVER

(75) Inventor: Naoto Adachi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 710 days.

(21) Appl. No.: 11/560,508

(22) Filed: Nov. 16, 2006

(65) Prior Publication Data

US 2007/0274406 A1 Nov. 29, 2007

(30) Foreign Application Priority Data

May 24, 2006 (JP) ............................. 2006-144141

(51) Int. Cl.
H04L 27/06 (2006.01)
(52) U.S. Cl. ..................... 375/340; 375/260; 375/350
(58) Field of Classification Search ................ 375/260, 375/340, 350
See application file for complete search history.

(56) References Cited

U.S. PATENT DOCUMENTS 7,177,376 B2 * 2/2007 Atungsiri et al. ............ 375/343
7,440,506 B2 * 10/2008 Atungsiri et al. ............ 375/260
2004/0246889 A1 12/2004 Ogawa et al.

FOREIGN PATENT DOCUMENTS

| EP | 1313242 A1 | 5/2003 |
|---|---|---|
| JP | 2001-292125 | 10/2001 |
| JP | 2002-026861 | 1/2002 |
| JP | 2002-64464 | 2/2002 |
| JP | 2004-266814 | 9/2004 |
| KR | 10-2004-0051610 | 6/2004 |
| WO | WO 2004100413 A1 * | 11/2004 |
| WO | WO 2005109712 A1 * | 11/2005 |

OTHER PUBLICATIONS

Office Action issued in corresponding Korean Patent Application No. 10-2006-0124490; mailed on Mar. 26, 2008.

* cited by examiner

Primary Examiner—David C Payne
Assistant Examiner—Leon Flores
(74) Attorney, Agent, or Firm—Staas & Halsey LLP (57) ABSTRACT

A carrier interpolation unit (a digital filter) performs interpolation processing of SP signal in the frequency domain. An IFFT circuit converts a frequency-domain signal into a time-domain signal. A delay profile generation unit generates a delay profile based on an output of the IFFT circuit. The filter control unit controls a pass band of the digital filter in accordance with the delay profile. An FFT window control unit controls a position of a window to extract a calculation range of FFT in accordance with the delay profile. When delay time of multipath is larger than the guard interval, and when the reception power of the interference wave is larger than a threshold, the pass band of the digital filter is minimized.

10 Claims, 10 Drawing Sheets

OFDM RECEIVER

CROSS REFERENCE TO RELATED APPLICATION

This application is based upon and claims the benefit of priority from the prior Japanese Patent Application No. 2006-144141, filed on May 24, 2006, the entire contents of which are incorporated herein by reference.

BACKGROUND OF THE INVENTION

1. Field of the Invention

The present invention relates to an OFDM receiver for receiving and demodulating an OFDM signal, and in particular, relates to a method for adjusting a filter for interpolating a pilot signal in an OFDM signal of digital terrestrial broadcasts in a frequency domain.

2. Description of the Related Art

As a system transmitting a digital signal, an Orthogonal Frequency Division Multiplexing (OFDM) has been proposed in recent years. In the OFDM system, data is transmitted employing a plurality of carriers orthogonal to each other in the frequency domain. For that reason, an OFDM transmitter modulates a transmission signal by utilizing Inverse Fast Fourier Transformation (IFFT), and an OFDM receiver demodulates the transmission signal by using Fast Fourier Transformation (FFT) Since the OFDM system has high frequency efficiency, application to the digital terrestrial broadcasts has been widely explored. It should be noted that OFDM has already been employed in ISDB-T (Integrated Services Digital Broadcasting-Terrestrial), which is a standard of the digital terrestrial broadcasts in Japan.

Figure 1:
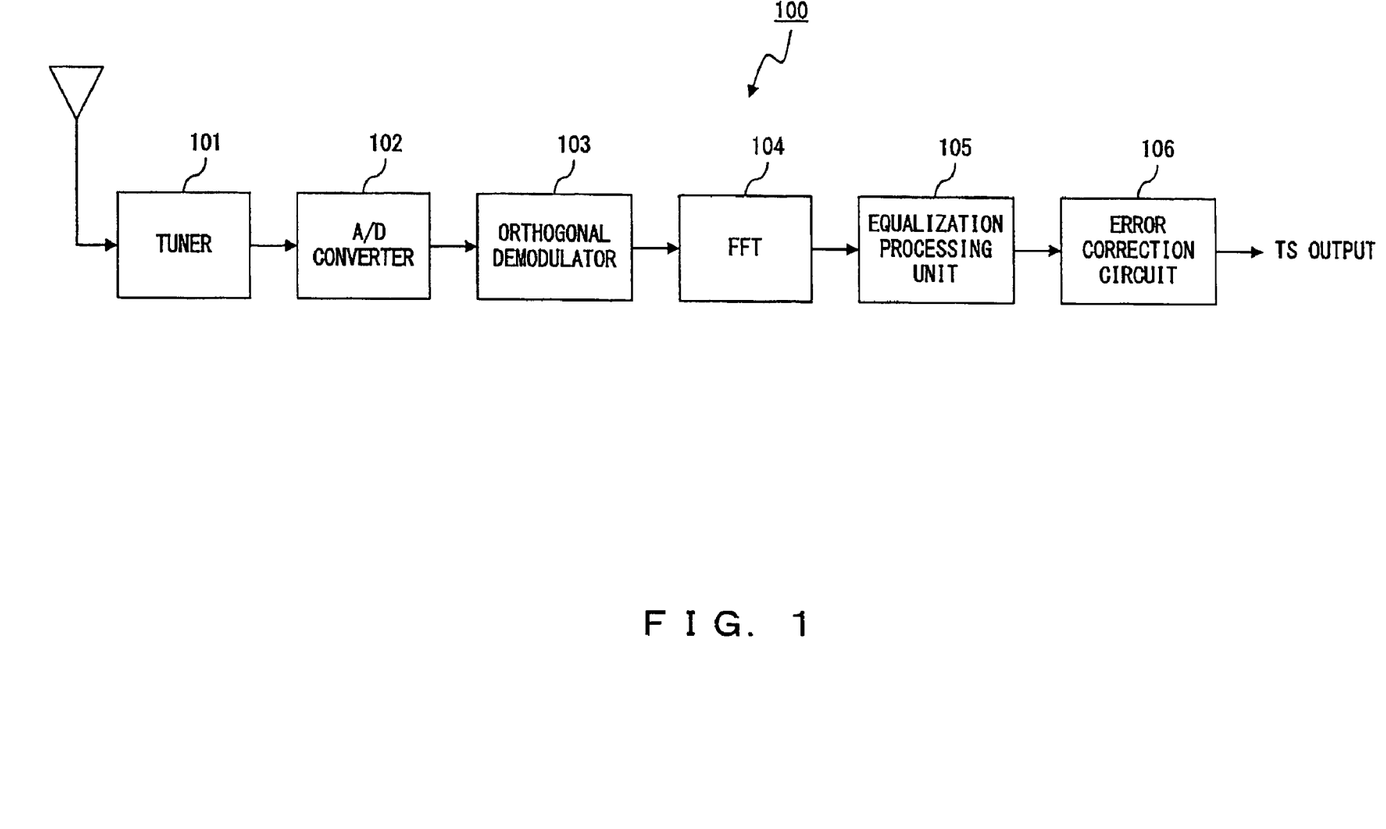
FIG. 1 is a diagram showing a configuration of a common OFDM receiver.

FIG. 1 is a diagram showing a configuration of a common OFDM receiver. In an OFDM receiver 100 shown in FIG. 1, an OFDM signal received via an antenna is fed to a tuner 101. The tuner 101 selects a signal of a desired channel from the received signal, and outputs the selected signal after converting into a signal in an intermediate frequency (IF) band. An A/D converter 102 converts the output signal of the tuner 101 into a digital signal. The digital signal is converted into a complex baseband signal by an orthogonal demodulator 103. The complex baseband signal, which is a time-domain signal, is converted into a frequency-domain signal by an FFT circuit 104. As a result, a plurality of signals transmitted by corresponding carriers, each having different frequencies, are obtained.

In addition to the data signal, a scattered pilot (SP) signal, an auxiliary channel (AC) signal, and a transmission and multiplexing configuration control (TMCC) signal etc. are transmitted in the digital terrestrial broadcasts. AC and TMCC are demodulated by a DQPSK demodulator apparatus, not shown in the drawing, and TMCC information including transmission parameters is extracted.

A data carrier transmitting the data signal and an SP carrier transmitting the scattered pilot signal (hereinafter referred to as the SP signal) are input to an equalization processing unit 105. The SP signal is a known signal, having the transmission phase and the transmission power determined in advance, and is used for synchronous detection and transmission path estimation (channel estimation). The equalization processing unit 105 performs interpolation processing of the SP signal. The equalization processing unit 105 equalizes the data signal using the result of the interpolation processing, and outputs the equalized data signal as demodulated data. In this description, the term "equalization" includes processing for correcting phase rotation occurred on the transmission path. The demodulated data is converted into binary data with one bit or a plurality of bits by de-mapping processing, and is output in Transform Stream (TS) format after correction processing by an error correction circuit 106.

Figure 2:
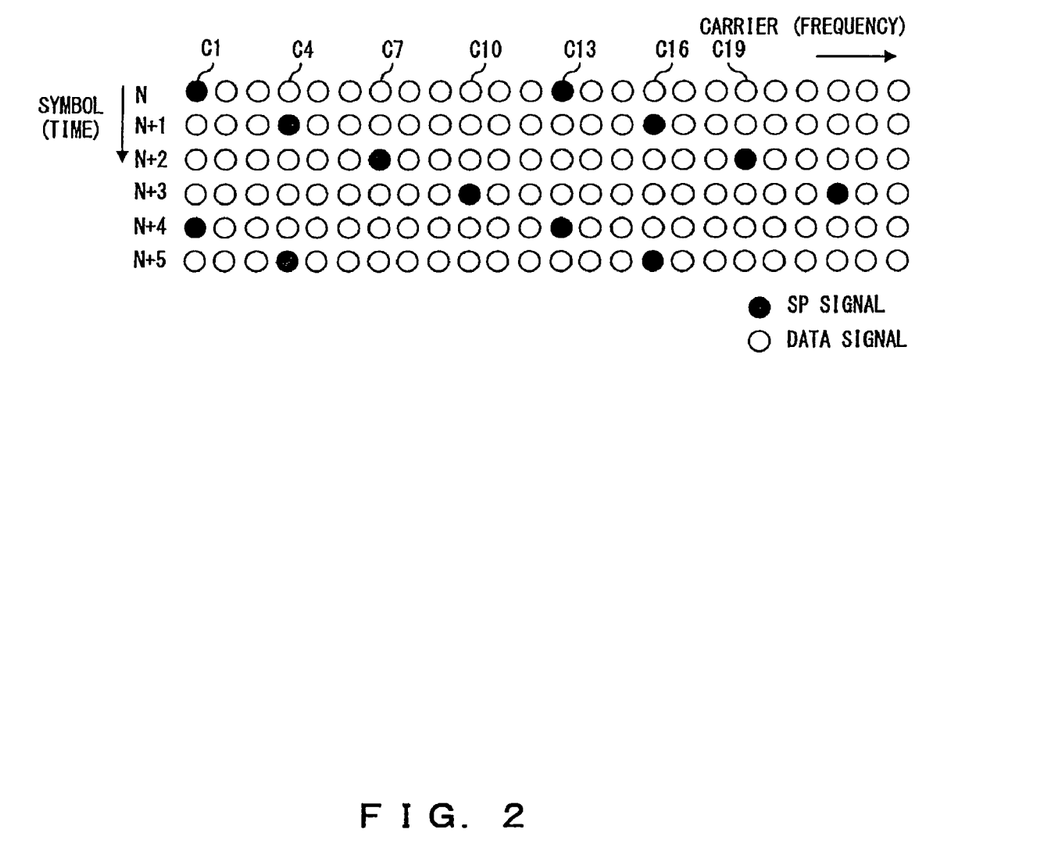
FIG. 2 is a diagram showing the arrangement of the SP signal.

FIG. 2 is a diagram showing the arrangement of the SP signal. The SP signal is inserted every 12 carriers in the frequency domain. Each carrier is provided at 1 kHz intervals in the mode 3 of the digital terrestrial broadcasts, for example. The SP signal is inserted every 4 symbols in the time domain. 1 symbol time is, for example, 1.008 ms. In the example shown in FIG. 2, the SP signals are transmitted using carriers C1, C13, . . . in a time slot for transmitting the $n^{th}$ symbol, and the SP signals are transmitted using carriers C4, C16, . . . in a time slot for transmitting the $n+1^{th}$ symbol.

Figure 3:
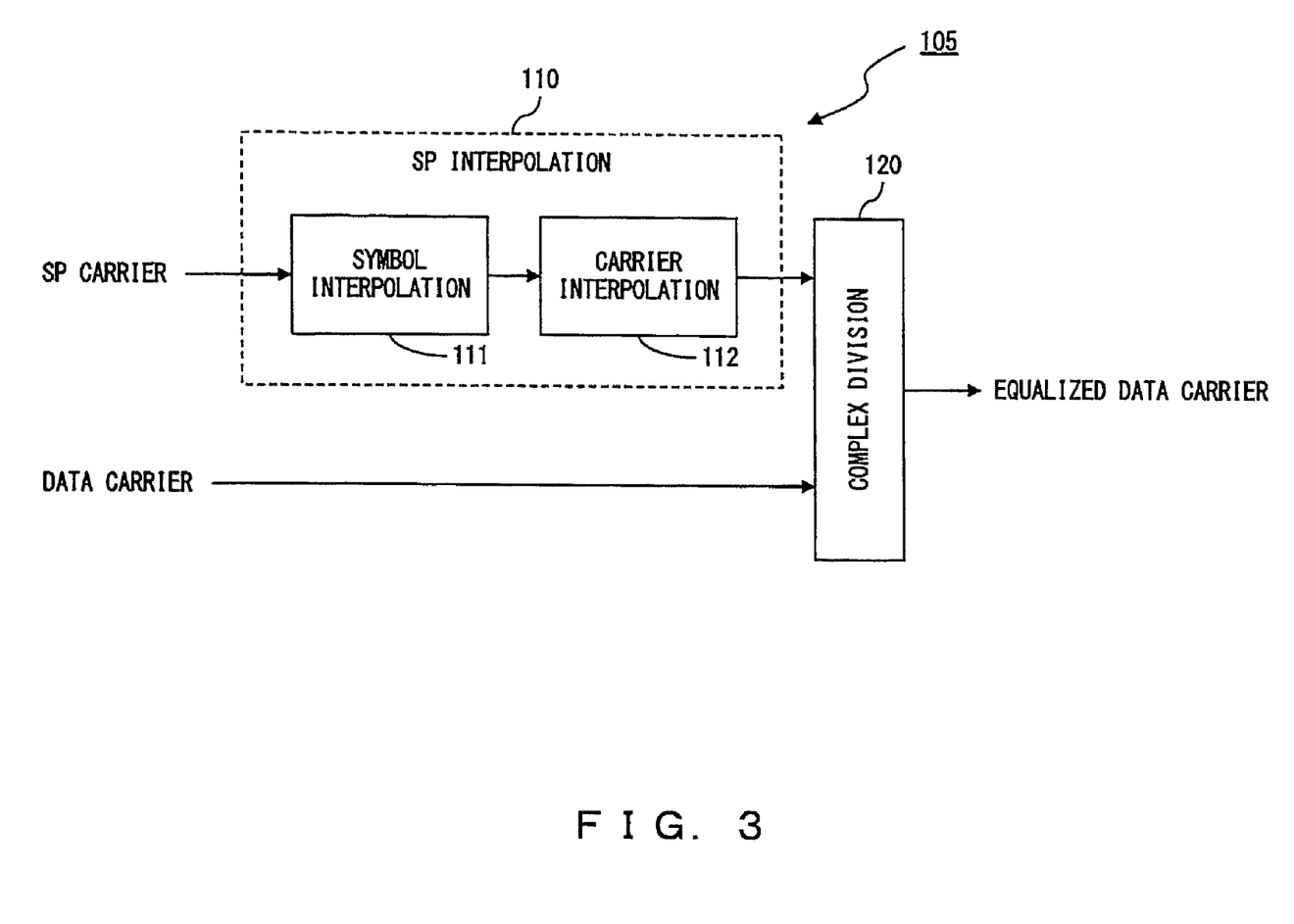
FIG. 3 is a diagram showing the configuration of a publicly known equalization processing unit.

FIG. 3 is a diagram showing a configuration of the equalization processing unit 105. The equalization processing unit 105 comprises an SP interpolation unit 110 and a complex division unit 120. The SP interpolation unit 110 comprises a symbol interpolation unit 111 and a carrier interpolation unit 112. The symbol interpolation unit 111 performs interpolation processing of each carrier transmitting the SP signal in the time domain. In the example of FIG. 2, for example, with respect to the carrier C1, signals of time slots N+1, N+2, and N+3 are estimated based on the signal of the time slot N and the signal of the time slot N+4. The same interpolation processing is performed for other carriers (C4, C7, C10, . . . ), on which the SP signals are arranged. As a result, in each of the carriers C1, C4, C7, C10, . . . , to which the SP signals are inserted, information of all symbols can be obtained.

The carrier interpolation unit 112 is, for example, a digital filter such as a FIR filter or an IIR filter, and performs interpolation processing in the frequency domain using the interpolation result of the symbol interpolation unit 111. In other words, in each time slot, by employing the signals of the carriers C1, C4, C7, . . . , signals of the carriers C2, C3, C5, C6, C8, C9, . . . are estimated. As a result, reception information of the SP signal in all carriers can be obtained. At that time, since the transmission phase and the transmission power of the SP signal are determined in advance, based on the reception information of the SP signal, the transmission path characteristic information (phase information etc.) of the SP signal can be obtained. That is, the SP interpolation unit 110 generates transmission path characteristic information for all carriers.

The complex division unit 120 corrects data signal by complex division calculation using the transmission path characteristic information obtained as described above. As a result, the data signals are equalized so as to remove the influence of the transmission path.

It should be noted that the OFDM receiver is described in Patent Documents 1-4, for example. The Patent Document 1 describes a technology for switching the coefficients of the filter comprising the equalization processing unit in accordance with the conditions of the transmission path. The Patent Document 2 describes a technology for adjusting a window position of FFT in accordance with the delay waves. The Patent Document 3 describes a technology for estimating the transmission path by performing Fourier transformation of the signal after removing interfering signal components based on the delay profile. The Patent Document 4 describes a technology for controlling the coefficient of the filter constituting the equalization processing unit based on the error rate of the received data.

[Patent Document 1]

Japanese Patent Application Publication No. 2002-64464

[Patent Document 2]

Japanese Patent Application Publication No. 2001-292125

[Patent Document 3]

Japanese Patent Application Publication No. 2004-266814

[Patent Document 4]

Japanese Patent Application Publication No. 2002-26861

In OFDM, in order to enhance the tolerance to multipath (reflected waves of a radio wave transmitted from a base station are generated, and the radio waves propagating the same signal arrive at one terminal via a plurality of paths in TV/Radio broadcasts or mobile telephone system), a guard interval is inserted into each interval of the symbols. The guard interval is obtained by adding the signal in the end portion of a symbol immediately before the symbol. At that time, the guard interval period is generally determined so that interference between symbols (a condition such that a signal of a symbol and a signal of the subsequent symbol are received at the same time) does not occur in an assumed multipath environment. In the case of the digital terrestrial broadcasts, the guard interval is ⅛ symbol time (i.e. 126 μs). Consequently, in general, the receiver can demodulate a signal to regenerate transmission data even under multipath environment in the OFDM system.

The interference between symbols occurs when the delay time of the multipath is larger than the guard interval, and reception quality is deteriorated. At that time, the interference between symbols rarely occurs since the guard interval period is generally determined to be larger than the assumed delay time. However, in some communication environments, delay time of multipath may be larger than the guard interval. For example, in a situation where radio waves propagating the same signal are received from two base stations, the time lag between a radio wave from one base station and a radio wave from the other base station may exceed the guard interval. In such a case, the interference between symbols practically occurs, and the reception quality is deteriorated. Note that the environment where the delay time of multipath exceeds the guard interval had been hardly envisioned up to now.

SUMMARY OF THE INVENTION

It is an objective of the present invention to improve reception quality in a case where delay time of multipath is larger than the guard interval in a communication system using OFDM.

The OFDM receiver of the present invention demodulates an OFDM signal having a pilot signal inserted in a frequency domain. The OFDM receiver comprises: a Fourier transformation circuit for performing Fourier transformation of the OFDM signal; a delay profile circuit for generating a delay profile of the pilot signal extracted from an output signal of the Fourier transformation circuit; an interpolation circuit for performing interpolation processing of the pilot signal extracted from the output signal of the Fourier transformation circuit in the frequency domain; a filter control circuit for controlling a filter characteristic of the interpolation circuit based on the delay profile; and a correction circuit for correcting a data signal extracted from the output signal of the Fourier transformation circuit using an output of the interpolation circuit. When a time difference between a main wave and an interference wave is larger than a guard interval of OFDM, the filter control circuit controls the filter characteristic of the interpolation circuit in accordance with a power ratio of the main wave and the interference wave.

In this invention, by generating the delay profile of the received signal, time lag between the main wave and the interference wave and a power ratio of the main wave to the interference wave are detected. When the time lag between the main wave and the interference wave is larger than the guard interval, interference between symbols occurs between the main wave and the interference wave. Therefore, the filter characteristic of the interpolation circuit is controlled in accordance with the power ratio of the main wave to the interference wave. Note that the interpolation circuit is realized by, for example, a digital filter.

When the power ratio of the main wave to the interference wave is less than a threshold (i.e. the reception power of the interference wave is relatively large), the influence of the interference between symbols becomes large. Therefore, in such a case, filter pass band is controlled so as to pass the main wave and to remove the interference wave, for example. On the other hand, when the power ratio of the main wave to the interference wave is more than a threshold (i.e. the reception power of the interference wave is adequately small), the influence of the interference between symbols is small. In such a case, consequently, the filter pass band is controlled so as to pass both of the main wave and the interference wave in order to avoid removal of information required in the frequency domain, for example.

According to the present invention, the reception quality in a case that delay time of multipath is larger than the guard interval is improved in a communication system using OFDM.

DESCRIPTION OF THE PREFERRED EMBODIMENT

Figure 4:
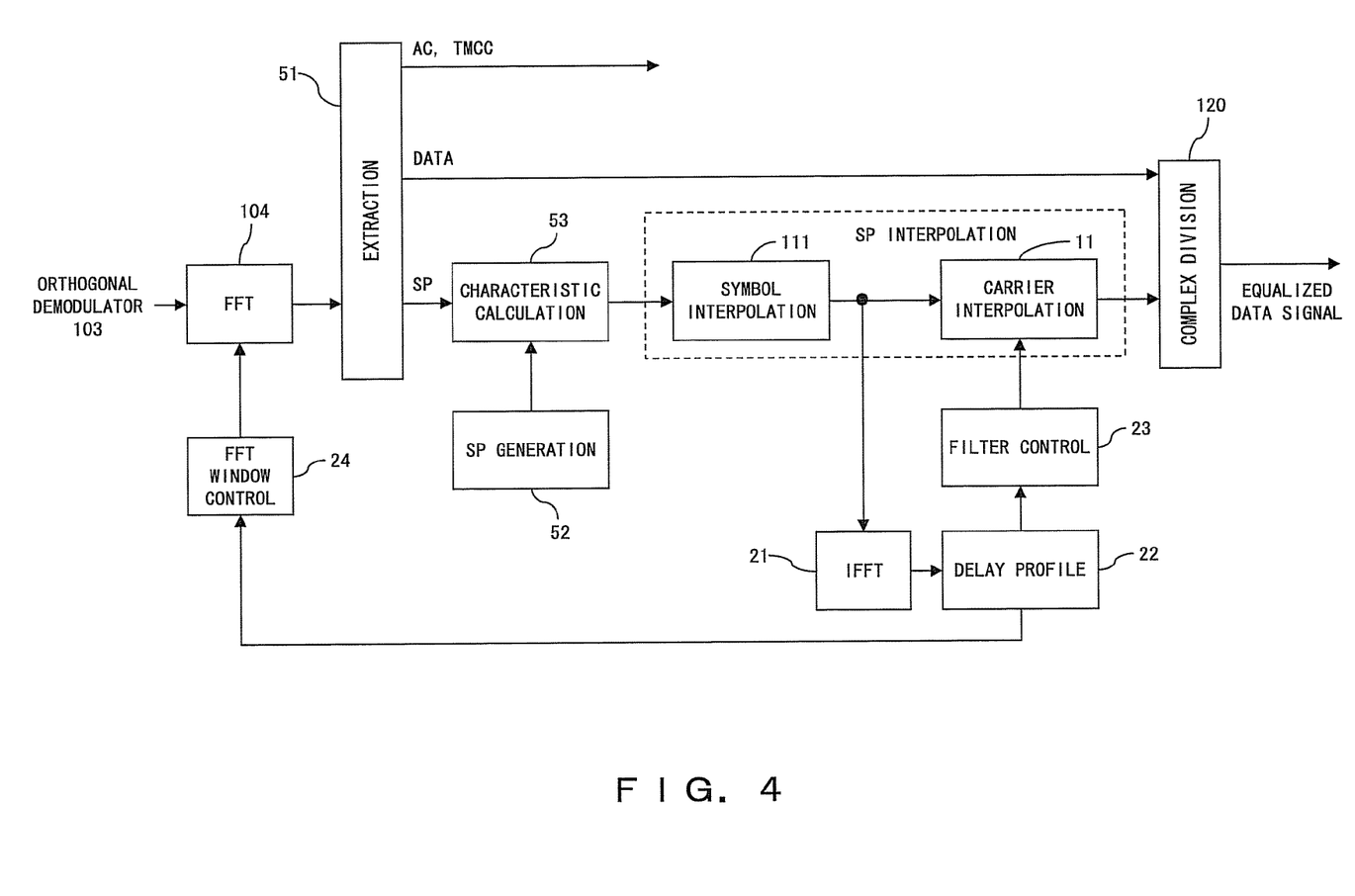
FIG. 4 is a diagram showing the configuration of the equalization processing unit provided in the OFDM receiver relating to the present invention.

FIG. 4 is a diagram showing the configuration of the equalization processing unit provided in the OFDM receiver relating to the present invention. It should be noted that the basic configuration of the OFDM receiver is the same as the configuration shown in FIG. 1. In other words, the equalization processing unit of the embodiments is provided with a frequency domain signal output from the FFT circuit 104 shown in FIG. 1. Assume that the OFDM receiver of the embodiments receives the digital terrestrial broadcasts.

In OFDM, a plurality of signals are transmitted by using a plurality of carriers, each of which having different frequencies. In the digital terrestrial broadcasts, a data signal, a scattered pilot (SP) signal, an auxiliary channel (AC) signal, and a transmission and multiplexing configuration control (TMCC) signal etc. are transmitted in parallel.

An extraction circuit 51 extracts each of the data signal, the SP signal, the AC signal, and the TMCC signal from the output signal of the FFT circuit 104. The data signal is sent to the complex division unit 120, and the SP signal is sent to a characteristic calculation unit 53. Note that the AC signal and the TMCC signal are demodulated by a DQPSK demodulator not shown in the drawing; however, the explanation is omitted since the signals are not directly related to the present invention.

An SP generation unit 52 generates the SP signal as a known signal. At that time, the transmission phase and the transmission power of the SP signal are determined in advance. The SP generation unit 52 generates the same SP signal as the SP signal transmitted from the transmitter apparatus.

The characteristic calculation unit 53 calculates transmission path characteristic information based on the SP signal extracted from the received signal and the SP signal generated by the SP generation unit 52. The transmission path characteristic information can be calculated, for example, by dividing the SP signal extracted from the received signal by the SP signal generated in the SP generation unit 52. Note that the extraction circuit 51, the SP generation unit 52, and the characteristic calculation unit 53 can be realized by the publicly known technologies, and therefore, they are omitted in FIG. 1 and FIG. 3.

The symbol interpolation unit 111, as explained with reference to FIG. 2 and FIG. 3, performs interpolation processing of the SP signal (transmission path characteristic information obtained based on the SP signal) in the time domain. Basic operations of a carrier interpolation unit 11 are the same as the carrier interpolation unit 112 shown in FIG. 3. In other words, the carrier interpolation unit 11 is a digital filter such as a FIR filter or an IIR filter, and performs interpolation processing in the frequency domain by using the interpolation result of the symbol interpolation unit 111. As a result, the transmission path characteristic information of the SP signal in all carriers is obtained.

The complex division unit 120, as explained with reference to FIG. 3, corrects the data signal by performing the complex division using the transmission path characteristic information. As a result, the data signals are equalized so as to remove the influence of the transmission path. The equalized data signal is de-mapped and is output in the TS format.

The IFFT circuit 21 converts the frequency-domain signal output from the symbol interpolation unit 111 to the time-domain signal by executing the inverse Fourier transformation. The delay profile generation unit 22 generates a delay profile by using the time-domain signal output from the IFFT circuit 21. The delay profile represents the reception power on the time axis. In other words, the delay profile represents each reception power of main wave (desired wave) components and interference waves (undesired wave) components. Consequently, by analyzing the delay profile, the delay time between the main wave and the interference wave and the reception power ratio between the main wave and the interference wave can be obtained. The main wave is, in general, a received wave with the largest reception power. The interference wave is a wave propagating a signal same as that of the main wave in the multipath environment, and is a delayed wave or a preceding wave of the main wave. It should be noted that in the environment where the radio wave propagating the same signal from a plurality of base stations, a radio wave from one base station is to be a main wave, and radio waves from other stations are to be interference wave.

A filter control unit 23 controls the filter characteristic of the carrier interpolation unit 11 based on the delay profile. Here, if the carrier interpolation unit 11 is an FIR filter, the filter control unit 23 controls the pass band by adjusting the tap coefficient of the FIR filter.

Figure 5:
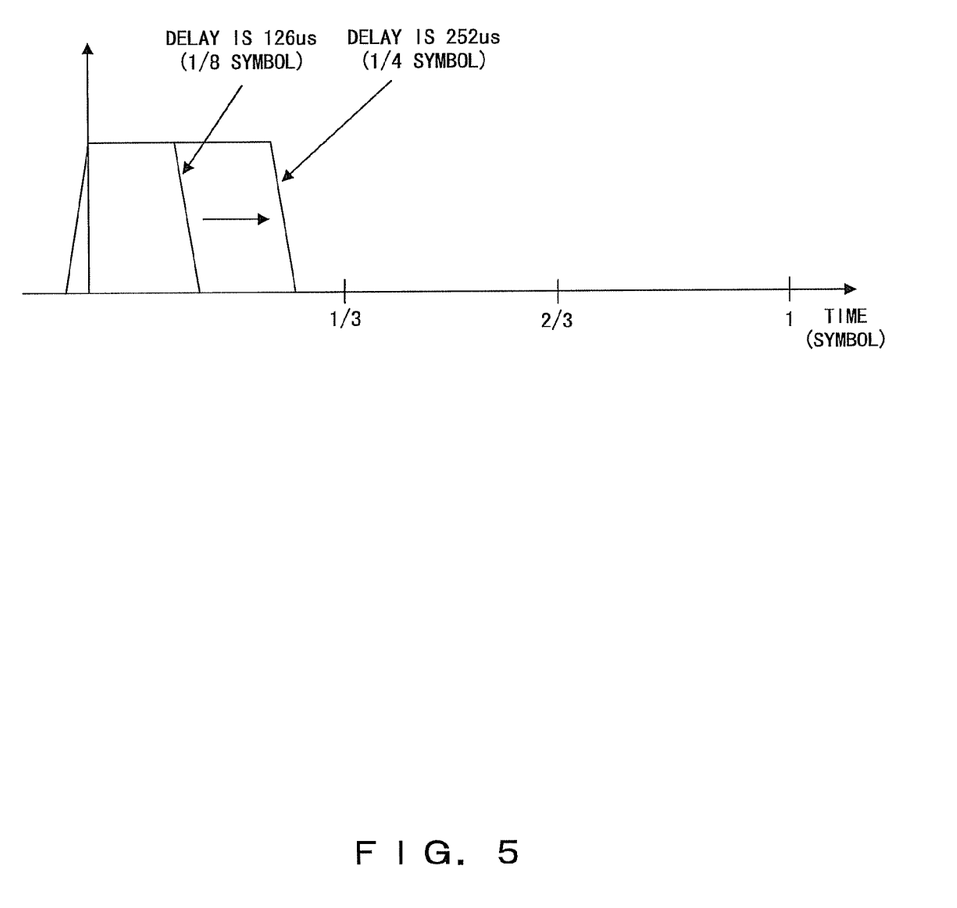
FIG. 5 is a diagram explaining control of the filter characteristic of the carrier interpolation unit.

FIG. 5 is a diagram explaining control of the filter characteristics of the carrier interpolation unit 11. In this example, 1 symbol time is assumed to be 1.008 ms. If the delay time of the interference wave from the main wave is 126 μs, for example, the filter control unit 23 sets the filter pass band to "⅛ symbol time (=126 μs)". Alternatively, if the delay time of the interference wave from the main wave is 252 μs, the filter control unit 23 sets the filter pass band to "¼ symbol time (=252 μs)". In other words, the filter control unit 23 basically sets the filter pass band to be time duration, which is the same as the delay time of the multipath or slightly larger than the delay time of the multipath. However, when the delay time of the multipath is larger than the guard interval, the pass band of the filter is controlled in accordance with the reception power ratio of the main wave to the interference wave, as explained in detail later.

Figure 6A:
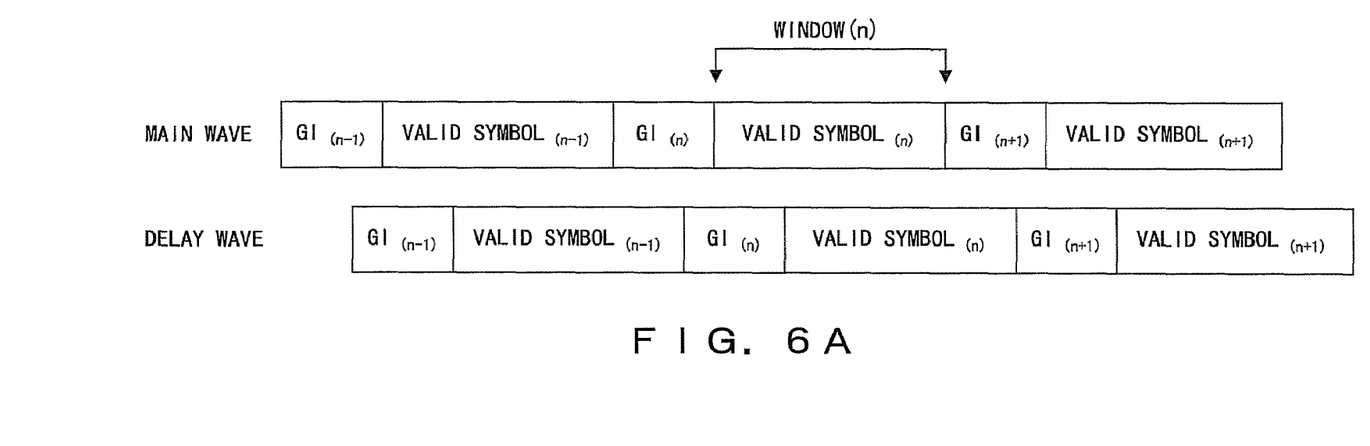
FIGS. 6A and 6B are diagrams explaining the control of the FFT window.
Figure 6B:
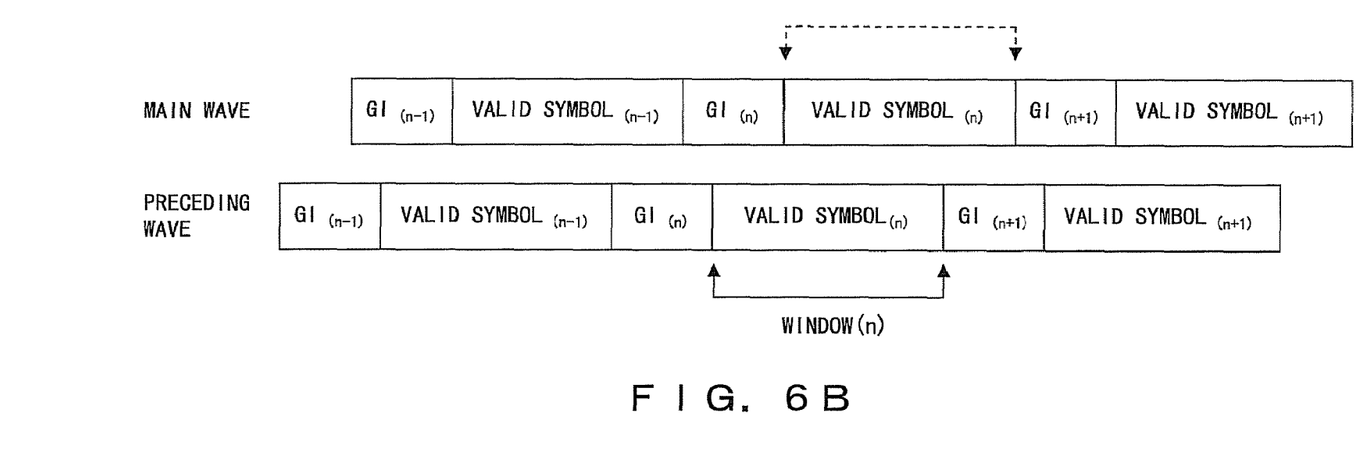

An FFT window control unit 24 controls the position of the window, which extracts the calculation range in the FFT circuit 104, based on the delay profile. Note that in OFDM, each symbol comprises a valid symbol and a guard interval (GI), as shown in FIG. 6A or 6B. The guard interval can be obtained by copying the signal in the end portion of the valid symbol and adding it to the head of the symbol.

In a case that the main wave and the delay wave are present, the FFT window control unit 24, as shown in FIG. 6A, sets the window position so as to extract a valid symbol of the main wave. In such a case, the FFT circuit 104 is provided with the valid symbol of the main wave (n), a part of a valid symbol of the delay wave (n), and a part of a guard interval of the delay wave (n). However, the signal of the guard interval (n) is the same as the signal of the valid symbol (n). Therefore, in such a case, only the signal of the symbol (n) is provided to the FFT circuit 104 and the interference between the symbols does not occur. In addition to the main wave signal components, the delay wave signal components are provided to the FFT circuit 104, and thus the degradation of the reception quality can be prevented.

On the other hand, in a case that the main wave and the preceding wave are present, the FFT window control unit 24 sets the window position so as to extract the valid symbol of the preceding wave as shown in FIG. 6B. By so doing, only the signal of the symbol (n) is provided to the FFT circuit 104, and the interference between symbols does not occur. It should be noted that when the main wave and its preceding wave are present and the window position is set so as to extract a valid symbol of the main wave, a part of information of the subsequent symbol is fed to the FFT circuit 104, and the reception quality is deteriorated.

As described above, the FFT window control unit 24 basically sets the window position so as to extract the main wave valid symbol in the presence of the main wave and its delay wave, and sets the window position so as to extract the preceding wave valid symbol in the presence of the main wave and its preceding wave. However, as explained in detail later, when the delay time of the multipath is larger than the guard interval, the setting of the window position can be changed in accordance with the ratio of the reception power of the main wave and the interference wave.

Details of the operation of the OFDM receiver of the embodiments are set forth. The following description assumes to be in the mode 3 of the digital terrestrial broadcasts. In other words, 1 symbol time is assumed to be 1.008 ms, and the guard interval is assumed to be ⅛ symbol time (126 μs). The carrier interpolation unit 11 comprises a digital filter such as an FIR filter.

First, the operation when the delay time of multipath is shorter than the guard interval is explained with reference to the FIGS. 7A, 7B, 8A and 8B.

Figure 7A:
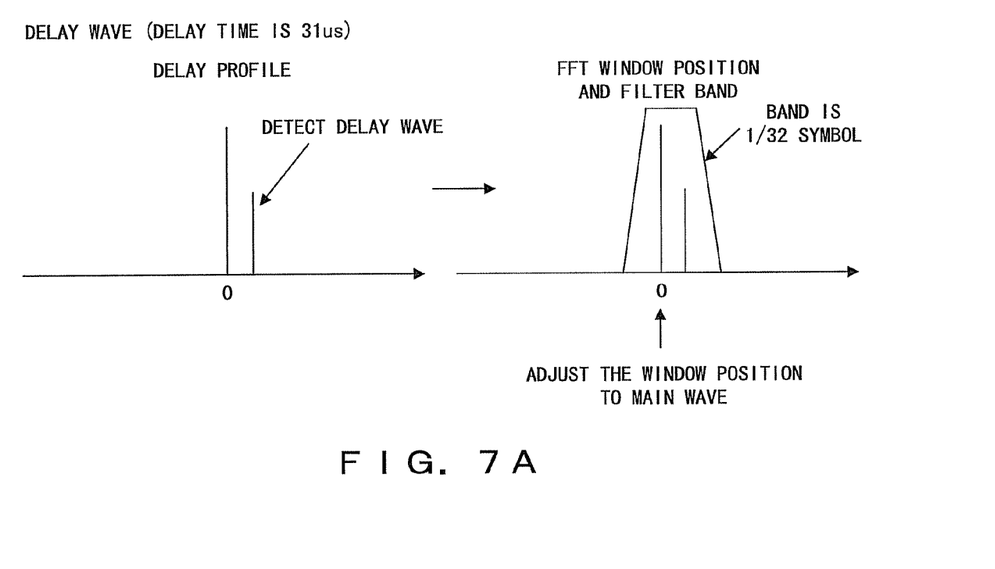
FIGS. 7A, 7B, 8A, 8B, 9A, 9B, 10A and 10B are diagrams explaining the control of the position of the FFT window and the pass band of the filter.

FIG. 7A is a diagram showing the operation in the presence of the main wave and its delay wave (delay time=31 μs). In such a case, the FFT window control unit 24 controls the window position so as to extract the main wave valid symbol. The filter control unit 23 sets the filter pass band to time duration, which is the same as the multipath delay time or slightly larger than the multipath delay time. In this case, "pass band=1/32 symbol time (32 μs)" is set.

Figure 7B:
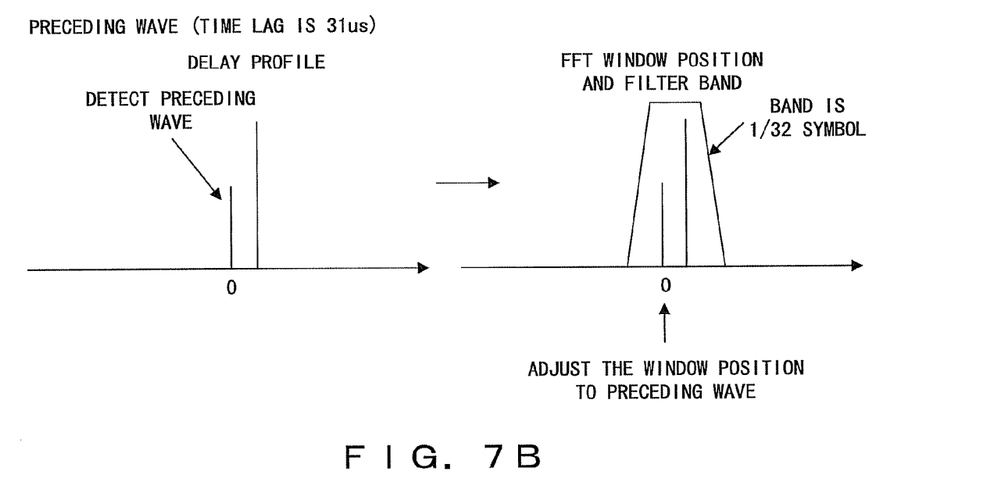

FIG. 7B is a diagram showing the operation in the presence of the main wave and its preceding wave (time lag=31 μs). In such a case, the FFT window control unit 24 controls the window position so as to extract the preceding wave valid symbol. The filter control unit 23 sets "pass band=1/32 symbol time (32 μs)".

Figure 8A:
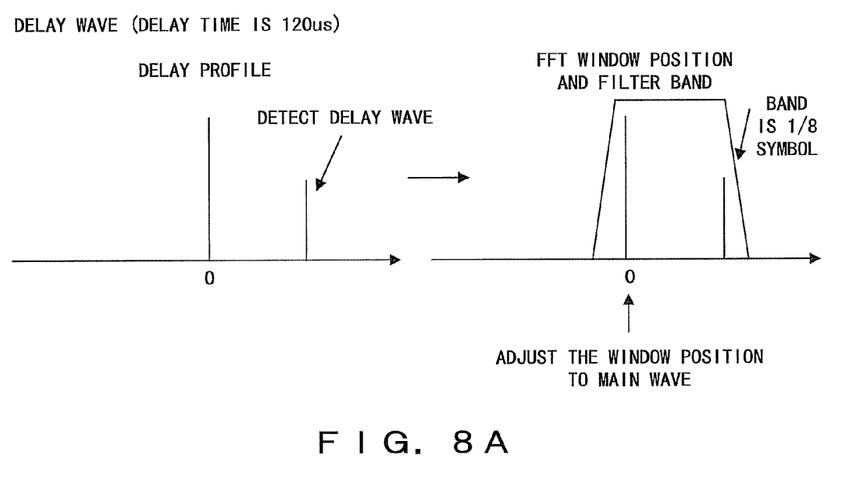

FIG. 8A is a diagram showing the operation in the presence of the main wave and its delay wave (delay time=120 μs). In such a case, the FFT window control unit 24 controls the window position so as to extract the main wave valid symbol. The filter control unit 23 sets "pass band=⅛ symbol time (126 μs)".

Figure 8B:
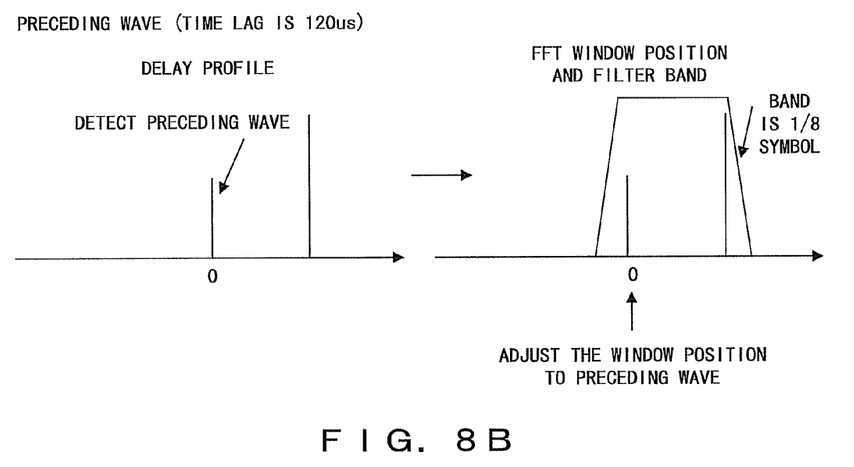

FIG. 8B is a diagram showing the operation in the presence of the main wave and its preceding wave (time lag=120 μs). In such a case the FFT window control unit 24 sets the window position so as to extract the preceding wave valid symbol. The filter control unit 23 sets "pass band=⅛ symbol time (126 μs)".

As described above, when the multipath delay time is smaller than the guard interval, the time duration, which is the same as the multipath delay time or slightly larger than the multipath delay time, is set as the filter pass band for carrier interpolation of the SP signal. In the presence of the main wave and its delay wave, the window position is set so as to extract the main wave valid symbol; while in the presence of the main wave and its preceding wave, the window position is set so as to extract the preceding wave valid symbol.

Next, the operation when the multipath delay time is larger than the guard interval is explained with reference to FIGS. 9A, 9B, 10A, and 10B. Note that the interference between symbols can occur when the multipath delay time is larger than the guard interval.

Figure 9A:
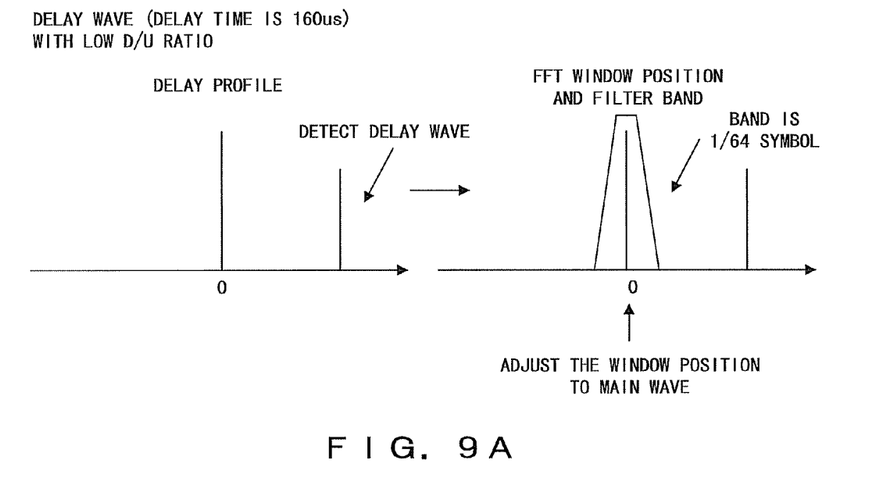

FIG. 9A is a diagram showing the operation when the main wave and its delay wave (delay time=160 μs) are present and when the D/U ratio is smaller than a threshold. The D/U ratio, here, is a ratio of reception power of desired waves as main waves to that of undesired waves as interference waves. In this description, "small D/U ratio" indicates that the difference in the power between the desired wave and the undesired wave is small. In this case, the FFT window control unit 24 controls the window position so as to extract the main wave valid symbol. The filter control unit 23 sets "pass band=1/64 symbol time (16 μs)".

Figure 9B:
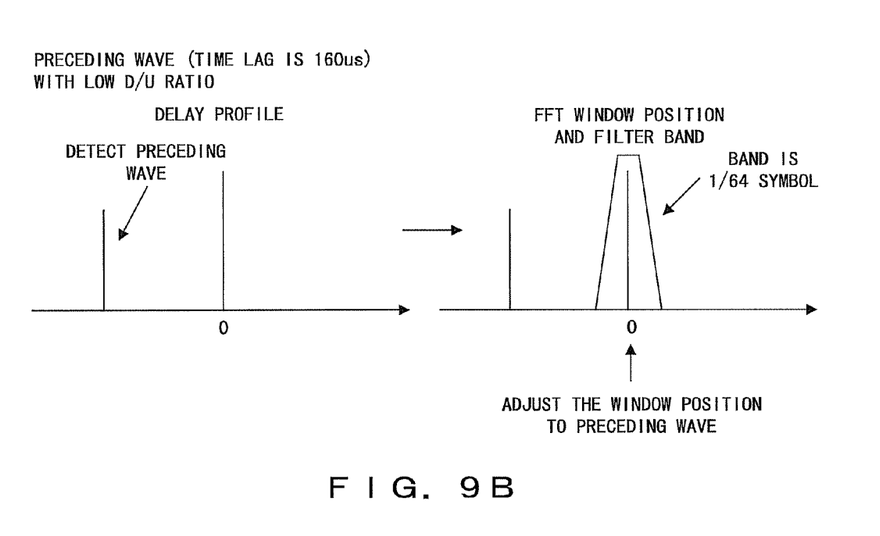

FIG. 9B is a diagram showing the operation when the main wave and its preceding wave are present and when the D/U ratio is smaller than a threshold. In such a case, the FFT window control unit 24 controls the window so as to extract the main wave valid symbol. The filter control unit 23 sets "pass band=1/64 symbol time (16 μs)".

As described above, when the multipath delay time is larger than the guard interval and when the reception power of the interference wave is relatively large, regardless of whether the interference wave is the preceding wave or the delay wave, the window position is controlled so as to extract the main wave valid symbol. The filter pass band for the carrier interpolation is minimized (16 μs in this case). In other words, controls of collecting the information relating to the main wave and of removing the information relating to the interference wave are performed. As a result, it is possible to suppress the influence of the interference wave, which causes the interference between symbols, and to reduce the deterioration of the reception quality.

It should be noted that the filter for the carrier interpolation is provided with the frequency-domain signal. For that reason, when removing the interference wave by narrowing the pass band of the filter, apart of the information transmitted by the main wave is also removed. The removal of the part of the information transmitted by the main wave would cause the deterioration of the reception quality. However, under the condition where the reception power of the interference wave is large, the reception deterioration by the interference between symbols due to the interference wave is a further serious problem. Therefore, in the OFDM receiver of the embodiments, by appropriate setting of the threshold of the D/U ratio, the filter pass band is controlled so as to remove the interference wave in a case where the quality deterioration caused by not removing the interference wave is serious rather than quality deterioration caused by removing the interference wave. At that time, the threshold of the D/U ratio is determined by experiments, simulations etc.

Figure 10A:
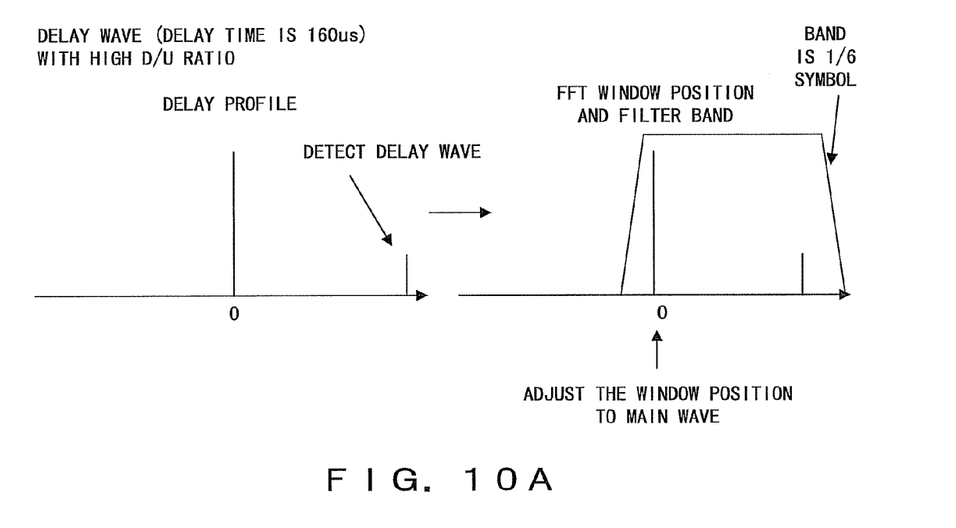

FIG. 10A is a diagram showing the operation when the main wave and its delay wave (delay time=160 μs) and when the D/U ratio is larger than a threshold. In such a case, the FFT window control unit 24 controls the window position so as to extract the main wave valid symbol. The filter control unit 23 sets "pass band=⅙ symbol time (168 μs)".

Figure 10B:
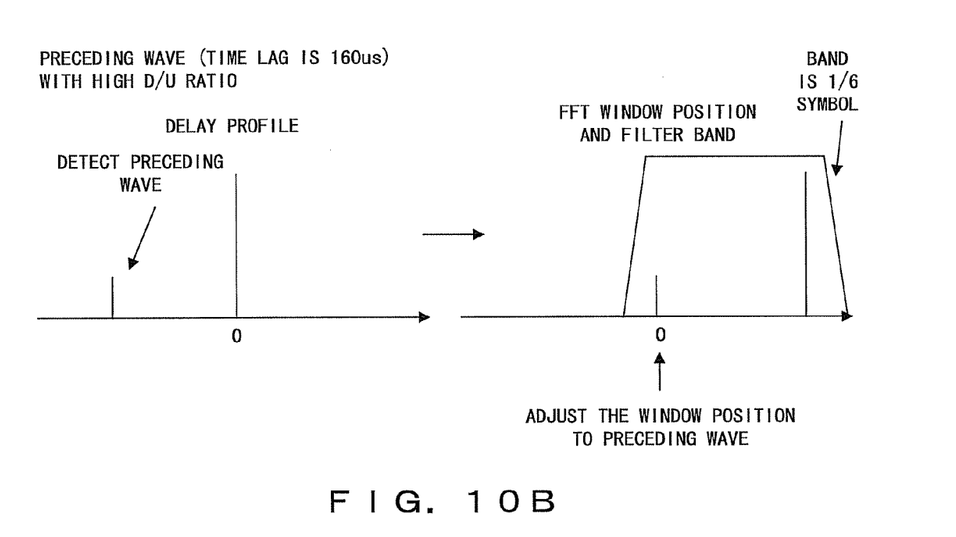

FIG. 10B is a diagram showing the operation when the main wave and its preceding wave (time lag=160 μs) are present, and when the D/U ratio is larger than a threshold. In such a case, the FFT window control unit 24 controls the window position so as to extract the preceding wave valid symbol. The filter control unit 23 sets "pass band=⅙ symbol time (168 μs)".

As described above, when the multipath delay time is larger than the guard interval and when the reception power of the interference wave is adequately small, the time duration, which is the same as the delay time or slightly larger than the delay time is set as the filter pass band. In other words, both of the main wave and the interference wave are used in the carrier interpolation processing. At that time, when the multipath delay time is larger than the guard interval, the quality deterioration due to the interference between symbols may occur if both of the main wave and the interference wave are used in the carrier interpolation processing. However, if the reception power of the interference wave is adequately small, the influence of the reception deterioration by the interference wave can be small.

It should be noted that the processing for controlling the FFT window and the pass band of the filter with the generation of the delay profile may be executed for every symbol, or may be executed in a prescribed period (e.g. every frame).

In addition, the function for controlling the FFT window and the pass band of the filter with the generation of the delay profile may be realized by a hardware circuit, or may be realized by using software.

What is claimed is:

1. An OFDM receiver for demodulating an OFDM signal including a pilot signal inserted in a frequency domain, comprising:
- a Fourier transformation circuit for performing Fourier transformation of the OFDM signal;
- a delay profile circuit for generating a delay profile of the pilot signal extracted from an output signal of said Fourier transformation circuit;
- an interpolation circuit for performing interpolation processing of the pilot signal extracted from the output signal of said Fourier transformation circuit in the frequency domain;
- a filter control circuit for controlling a filter characteristic of said interpolation circuit based on the delay profile; and
- a correction circuit for correcting a data signal extracted from the output signal of said Fourier transformation circuit using an output of said interpolation circuit, wherein
- the filter control circuit compares a guard interval of OFDM with a time lag between a main wave and an interference wave, determines whether the time lag is larger than the guard interval, calculates a power ratio of the main wave and the interference wave when the time lag is larger than the guard interval, and controls the filter characteristic of said interpolation circuit in accordance with the calculated power ratio of the main wave and the interference wave.

2. The OFDM receiver according to claim 1, wherein
said interpolation circuit comprises an FIR filter, and
said filter control circuit controls a pass band by adjusting a tap coefficient of the FIR filter.

3. The OFDM receiver according to claim 1, wherein
said filter control circuit, when the time lag between the main wave and the interference wave is larger than the guard interval of OFDM, and when the power ratio of the main wave to the interference wave is less than a threshold, controls the filter characteristic to pass the main wave and to remove the interference wave.

4. The OFDM receiver according to claim 1, wherein
said filter control circuit, when the time lag between the main wave and the interference wave is larger than the guard interval of OFDM, and when the power ratio of the main wave to the interference wave is more than a threshold, controls the filter characteristic to pass both of the main wave and the interference wave.

5. The OFDM receiver according to claim 1, further comprising:
- a window control circuit for controlling a position of a window to extract a calculation range in said Fourier transformation circuit using the delay profile.

6. The OFDM receiver according to claim 5, wherein
said window control circuit, when the time lag between the main wave and the interference wave is larger than the guard interval of OFDM, and when the power ratio of the main wave to the interference wave is less than a threshold, sets the window so as to extract the main wave.

7. The OFDM receiver according to claim 5, wherein
said window control circuit, when the time lag between the main wave and a delay interference wave is larger than the guard interval of OFDM, and when the power ratio of the main wave to the delay interference wave is more than a threshold, sets the window so as to extract the main wave.

8. The OFDM receiver according to claim 5, wherein the window control circuit, when the time lag between the main wave and a preceding interference wave is larger than the guard interval of OFDM, and when the power ratio of the main wave to the preceding interference wave is more than a threshold, sets the window so as to extract the preceding interference wave.

9. The OFDM receiver according to claim 1, wherein
the pilot signal is a scattered pilot signal of digital terrestrial broadcasts.

10. A equalization method for equalizing a data signal in an OFDM receiver for demodulating an OFDM signal including a pilot signal inserted in a frequency domain, comprising:
- performing Fourier transformation of the OFDM signal using a Fourier transformation circuit;
- generating a delay profile of the pilot signal extracted from an output signal of the Fourier transformation circuit;
- performing interpolation processing of the pilot signal extracted from the output signal of the Fourier transformation circuit in the frequency domain based on the delay profile;
- comparing a guard interval of OFDM with a time lag between a main wave and an interference wave, determining whether the time lag is larger than the guard interval, calculating a power ratio of the main wave and the interference wave when the time lag is larger than the guard interval, and controlling a filter characteristic for the interpolation processing in accordance with the calculated power ratio of the main wave to the interference wave; and
- correcting and outputting the data signal extracted from the output signal of the Fourier transformation circuit using information obtained by the interpolation processing.

* * * * *